US012658486B2

(12) United States Patent
Hamamoto et al.

(10) Patent No.: US 12,658,486 B2
(45) Date of Patent: Jun. 16, 2026

(54) POWER STORAGE PACK AND ELECTRIC MOVING BODY

(71) Applicant: Panasonic Intellectual Property Management Co., Ltd., Osaka (JP)

(72) Inventors: Katsuaki Hamamoto, Gifu (JP); Naohisa Morimoto, Osaka (JP); Koki Yamanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 177 days.

(21) Appl. No.: 18/682,145

(22) PCT Filed: Jul. 20, 2022

(86) PCT No.: PCT/JP2022/028248
§ 371 (c)(1),
(2) Date: Feb. 8, 2024

(87) PCT Pub. No.: WO2023/021911
PCT Pub. Date: Feb. 23, 2023

(65) Prior Publication Data
US 2024/0347790 A1     Oct. 17, 2024

(30) Foreign Application Priority Data
Aug. 18, 2021     (JP) ................................. 2021-133347

(51) Int. Cl.
*H01M 50/267* (2021.01)
*H01M 10/42* (2006.01)
(Continued)

(52) U.S. Cl.
CPC ..... *H01M 10/425* (2013.01); *H01M 10/4221* (2013.01); *H01M 50/249* (2021.01);
(Continued)

(58) Field of Classification Search
CPC .......... H01M 10/425; H01M 10/4221; H01M 50/249; H01M 50/296; H01M 2010/4278;
(Continued)

(56) References Cited

U.S. PATENT DOCUMENTS

| 11,303,136 B2 | 4/2022 | Koch et al. |
| 2009/0039833 A1 | 2/2009 | Kitagawa |
(Continued)

FOREIGN PATENT DOCUMENTS

| EP | 3836286 A1 | 6/2021 |
| EP | 4071886 A1 | 10/2022 |
(Continued)

OTHER PUBLICATIONS

International Search Report of PCT application No. PCT/JP2022/028248 dated Oct. 4, 2022.
(Continued)

*Primary Examiner* — Muhammad S Islam
(74) *Attorney, Agent, or Firm* — Rimon P.C.

(57) ABSTRACT

In a power storage pack, a power storage unit feeds electric power to an electric moving body. A controller superimposes a current pattern representing identification information of the power storage pack on electric power to be supplied to electric moving body. The controller generates a current pattern with current values of a plurality of levels other than zero level. The controller may superimpose a current pattern on electric power supplied to an electric moving body through a precharge circuit.

8 Claims, 5 Drawing Sheets

(51) Int. Cl.

| | |
|---|---|
| *H01M 50/249* | (2021.01) |
| *H01M 50/296* | (2021.01) |
| *H02P 23/00* | (2016.01) |
| *H04W 12/06* | (2021.01) |
| *B60L 15/20* | (2006.01) |
| *B62M 6/90* | (2010.01) |

(52) U.S. Cl.
CPC .......... *H01M 50/296* (2021.01); *H02P 23/00* (2013.01); *H04W 12/06* (2013.01); *B60L 15/20* (2013.01); *B62M 6/90* (2013.01); *H01M 2010/4278* (2013.01); *H01M 2220/20* (2013.01)

(58) Field of Classification Search
CPC .......... H01M 2220/20; H01M 10/4257; H02P 23/00
See application file for complete search history.

(56) References Cited

U.S. PATENT DOCUMENTS

| | | | |
|---|---|---|---|
| 2020/0235442 A1 | 7/2020 | Yamashita et al. | |
| 2023/0050076 A1 | 2/2023 | Hamamoto et al. | |
| 2023/0095740 A1* | 3/2023 | Kuranuki | G01R 27/08 |
| | | | 429/7 |

FOREIGN PATENT DOCUMENTS

| | | |
|---|---|---|
| JP | 2006-302733 | 11/2006 |
| JP | 2011-125186 | 6/2011 |
| WO | WO2018005631 A1 | 1/2018 |
| WO | 2021/149488 | 7/2021 |

OTHER PUBLICATIONS

The EPC Office Action dated Aug. 12, 2024 for the related European Patent Application No. 22858233.4.

* cited by examiner

POWER STORAGE PACK AND ELECTRIC MOVING BODY

CROSS-REFERENCE TO RELATED APPLICATIONS

This application is a U.S. national stage application of the PCT International Application No. PCT/JP2022/028248 filed on Jul. 20, 2022, which claims the benefit of foreign priority of Japanese patent application No. 2021-133347 filed on Aug. 18, 2021, the contents all of which are incorporated herein by reference.

TECHNICAL FIELD

The present disclosure relates to a power storage pack detachable to an electric moving body, and an electric moving body.

BACKGROUND ART

Recently, electrically assisted bicycles have become popular. Electrically assisted bicycles use a detachable and portable battery pack. In order to eliminate terminals for communication lines from a connector of a battery pack, a system has been developed in which a wireless communication function is installed on the battery pack and an electrically assisted bicycle to transmit control signals wirelessly.

When a plurality of electrically assisted bicycles is present within a range capable of being wirelessly communicated with a battery pack, there is a risk that the mounted battery pack may be incorrectly controlled by another vehicle adjacent to the own vehicle, so that safety and security of the entire system cannot be ensured. In particular, in rental services and sharing services, a plurality of electrically assisted bicycles may often be parked in one bicycle-parking space. For operating the entire system safely and securely, individual electrically assisted bicycles need to correctly identify the mounted battery pack.

PTL 1 discloses a technique of checking connection between a vehicle and a power feeding device using wireless communication when a vehicle in which the power storage device is installed is connected to a power feeding device disposed outside with a charging cable. The connection of the power feeding device with the vehicle is recognized based on patterns of supply and cutoff of electric power from the power feeding device and pattern information transmitted wirelessly.

CITATION LIST

Patent Literature

[PTL 1] Japanese Unexamined Patent Application, Publication No. 2011-125186

SUMMARY OF THE INVENTION

In general, simple vehicles like electrically assisted bicycles do not incorporate a dedicated battery to operate a control circuit, and are supplied with a control power source from a mounted power battery pack. In this case, even if identification information of the battery pack is notified from the battery pack to a vehicle in a pattern of power supply and cutoff using a power line, it is difficult to detect the identification information at the vehicle.

The present disclosure has been made in view of the above-mentioned circumstances. An object of the present disclosure is to provide a technology of notifying identification information easily detected at an electric moving body from a power storage pack to an electric moving body using a power line.

In order to solve the above-mentioned problem, a power storage pack of one aspect of the present disclosure includes a power storage unit for feeding electric power to an electric moving body, and a controller superimposing a current pattern representing identification information of the power storage pack on the electric power supplied to the electric moving body. The controller generates the current pattern with current values of a plurality of levels other than zero level.

According to the present disclosure, identification information easily detected at an electric moving body can be notified from a power storage pack to an electric moving body using a power line.

BRIEF DESCRIPTION OF THE DRAWINGS

FIG. 5 is a waveform diagram showing an example of an operation from the battery pack to the vehicle when the power source is turned on.

FIG. 6 is a waveform diagram showing another example of an operation from the battery pack to the vehicle when the power source is turned on.

DESCRIPTION OF EMBODIMENT

Figure 1:
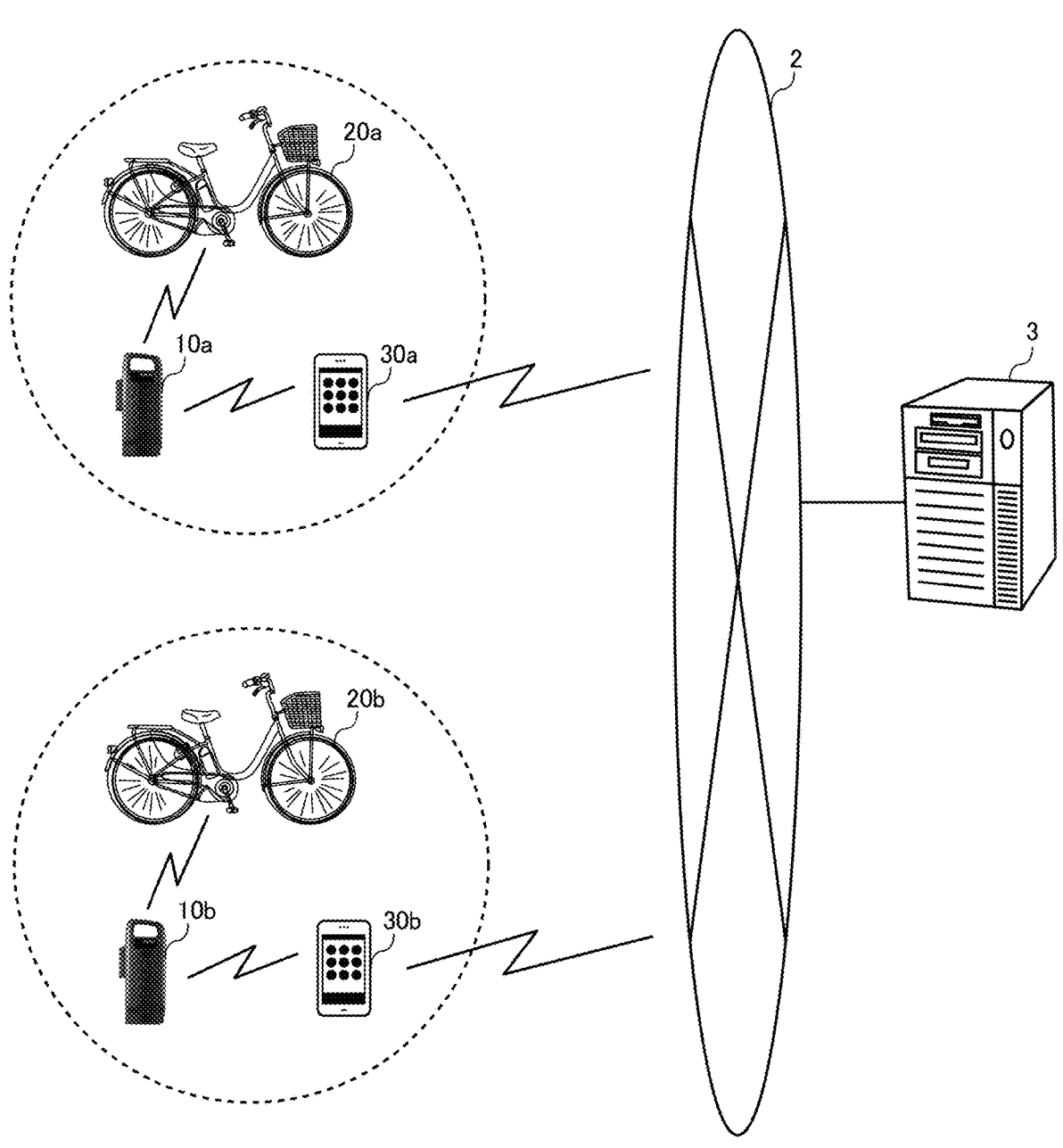
FIG. 1 is a view showing an overall configuration of a management service of a battery pack in accordance with an exemplary embodiment of the present disclosure.

FIG. 1 is a view showing an overall configuration of a management service of a battery pack in accordance with an exemplary embodiment. Battery pack 10 is a detachable and portable/replaceable battery pack 10 and can be mounted on a mounting slot of vehicle 20 or a charger (not shown). Hereinafter, in the exemplary embodiment, an electrically assisted bicycle is assumed as vehicle 20.

Since replaceable battery pack 10 frequently undergoes attachment and detachment with respect to the mounting slot of vehicle 20 or a charger, a connector part of battery pack 10 is easily deteriorated. Thus, in this exemplary embodiment, a wireless communication function is installed in battery pack 10 to transmit control signals by wireless communication. This can eliminate a terminal for a communication line from the connector of battery pack 10, and can only use a terminal for a power line.

For wireless communication between vehicle 20 and battery pack 10, near-field wireless communication is used. Examples of the near-field wireless communication include Bluetooth (registered trademark), Wi-Fi (registered trademark), infrared communication, and the like. Hereinafter, in this exemplary embodiment, use of BLE (Bluetooth Low Energy) is assumed as the near-field wireless communication.

The BLE is one of the extended standards of Bluetooth and a low power consumption and near-field wireless communication standard using the 2.4 GHz band. The BLE is suitable for battery drive because the BLE consumes electric power that is low enough to allow several years of driving with a single button battery, thus minimizing the impact on the remaining capacity of battery pack 10. Many modules for BLE communications have been shipped to the market, and therefore are available at low cost.

Furthermore, the BLE is highly compatible with smartphones and can provide a variety of services linked with smartphones. In this exemplary embodiment, battery pack 10 and portable terminal device 30 possessed by a user are connected by near-field wireless communication. Examples of portable terminal device 30 include a smartphone, a smart watch, a tablet, a small laptop computer, a portable game instrument, and the like. Hereinafter, in this exemplary embodiment, a smartphone is assumed as portable terminal device 30. It is assumed that battery pack 10 and a smartphone are connected by BLE.

Battery pack management system 3 is a system that collectively manages states of a plurality of battery packs 10. Battery pack management system 3 is constructed on, for example, the battery manufacturer's own server placed in its own facility or a data center, or on a cloud server used based on a cloud service agreement. Note here that battery pack management systems 3 may be constructed not by battery manufacturers but by operating entities providing rental service and a sharing service of electrically assisted bicycles.

Battery pack management system 3 and portable terminal device 30 are connected to network 2. Network 2 is a generic term for communication paths such as the Internet, leased lines, and virtual private networks (VPNs), regardless of a communication medium or a protocol. Examples of the communication medium include a mobile phone network (cellular network), a wireless local area network (LAN), a wired LAN, an optical fiber network, an Asymmetric Digital Subscriber Loop (ADSL) network, a community antenna television (CATV) network, and the like. Examples of the communication protocol include TCP (Transmission Control Protocol)/IP (Internet Protocol), UDP (User Datagram Protocol)/IP, Ethernet (registered trademark), and the like.

In this exemplary embodiment, portable terminal device 30 is connected to network 2 via a base station or a Wi-Fi access point of the 4G/5G cellular network. Battery pack management system 3 is connected to network 2 through a router. Battery pack 10 is connected to portable terminal device 30 by near-field wireless communication, and thereby can be indirectly connected to devices on the Internet.

Battery pack management system 3 manages basic information including identification information (pack ID), date of manufacture, owner information (name, address, phone number, e-mail address, etc.), and warranty contents, of each battery pack 10. In the case of battery pack 10 used for rental and sharing services of electrically assisted bicycles, an owner and a manager may be different from each other. In that case, battery pack management system 3 also manages information of the manager. In addition, battery pack management system 3 can also manage user information of users who currently rent and use electrically assisted bicycles.

Battery pack management system 3 can obtain status information indicating the present state of each battery pack 10 paired with each mobile terminal device 30 through mobile terminal device 30 of each user. For example, the SOH (State of Health) of battery pack 10 can be obtained. When the SOH of battery pack 10 falls below a predetermined value, battery pack management system 3 can notify by email an owner or a manager of a state that battery pack 10 should be replaced.

Furthermore, battery pack management system 3 can also obtain present location information of battery pack 10 via portable terminal device 30. As the present location information of battery pack 10, GPS (Global Positioning System) information of the paired mobile terminal device 30 can be used. In the case of rental and sharing services, battery pack management system 3 can notify portable terminal device 30 of a user who is currently using the electrically assisted bicycle of a return location of the electrically assisted bicycle.

A radio wave coverage of the BLE is about 10 meters when a typical Class 2 device is used. Therefore, a state in which a plurality of vehicles 20a, 20b and a plurality of battery packs 10a, 10b are present in one communication range of BLE may occur. In such a case, radio wave interference may occur between vehicle systems, resulting in an unstable operation. Furthermore, vehicle 20 may be misconnected to battery pack 10 other than battery pack 10 mounted in the vehicle. In such a case, battery pack 10 that is not mounted may be controlled incorrectly.

Thus, a mechanism is required to ensure that battery pack 10 mounted on vehicle 20 and battery pack 10 of a communication partner of vehicle 20 are identical. In this exemplary embodiment, identification information (ID) is used to check that battery pack 10 physically connected to vehicle 20 by wire and the battery pack 10 connected by wireless communication are identical to each other. The identification information (ID) may be identification information unique to each battery pack 10 or may be temporal identification information. As unique identification information, for example, a Bluetooth Device (BD) address or Medium Access Control (MAC) address may be used.

Figure 2:
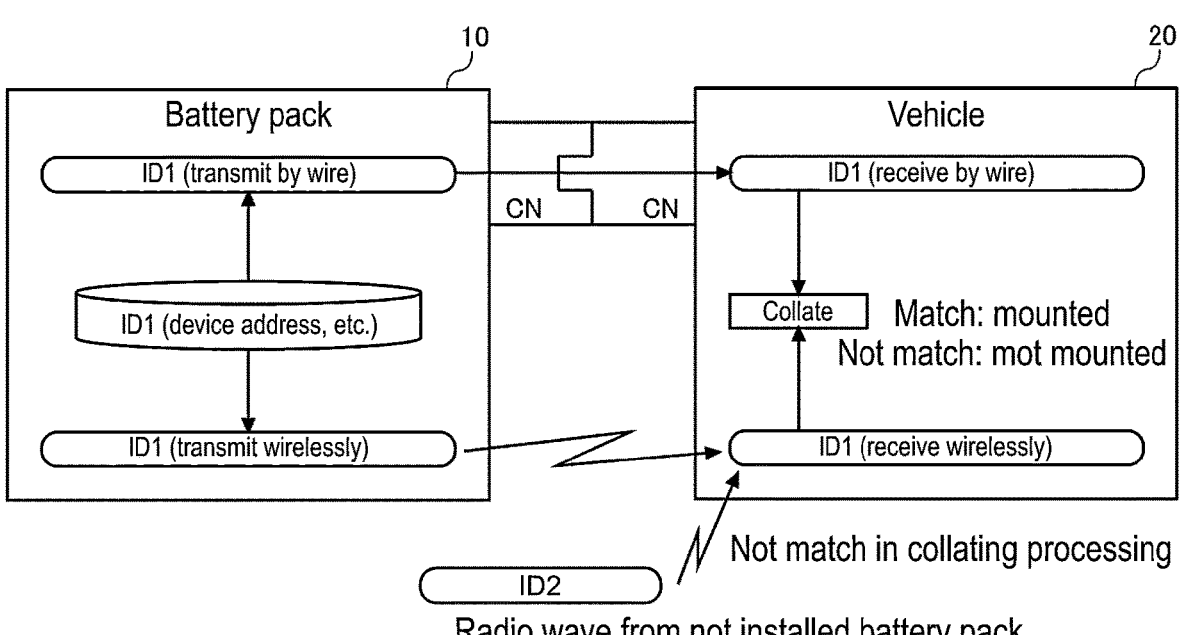
FIG. 2 is a view to illustrate an outline of authentication processing of the battery pack mounted on a vehicle.

FIG. 2 is a diagram to illustrate an outline of authentication processing of battery pack 10 to be mounted on vehicle 20. When the connector of battery pack 10 is connected to a connector of the mounting slot of vehicle 20, battery pack 10 transmits ID1 through wire. At the same time, battery pack 10 sends an advertisement packet (beacon packet) including ID1 via near-field wireless communication. The advertisement packet is a signal used for announcing one's presence to the surroundings via near-field wireless communication.

Vehicle 20 receives an advertisement packet, and then collates the ID1 included in the advertisement packet and the ID1 received through wire. When both match, vehicle 20 authenticates that mounted battery pack 10 is identical to the communication partner of the near-field wireless communication. When both do not match, vehicle 20 determines that mounted battery pack 10 is not identical to the communication partner of the near-field wireless communication and does not authenticate battery pack 10 of the communication partner. For example, when an advertisement packet including ID2 is received, since the ID2 does not match the ID1 received through wire, vehicle 20 does not authenticate battery pack 10 to which the advertisement packet including ID2 is transmitted.

Figure 3:
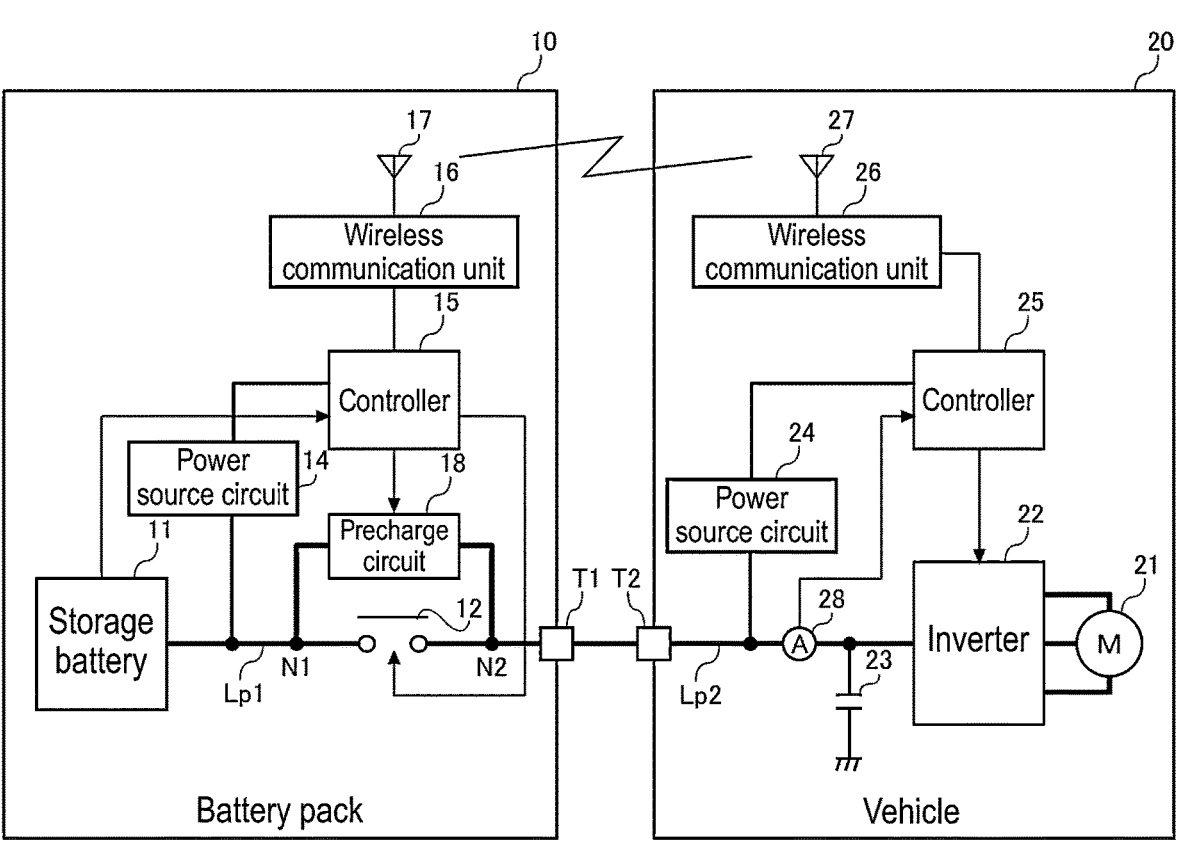
FIG. 3 is a view showing a configuration example of the battery pack and the vehicle in accordance with the exemplary embodiment.

FIG. 3 is a diagram showing a configuration example of vehicle 20 of battery pack 10 in accordance with the exemplary embodiment. An example shown in FIG. 3 presumes a state in which battery pack 10 is mounted on vehicle 20.

Battery pack 10 includes storage battery 11, main relay 12, first power source circuit 14, first controller 15, first wireless communication unit 16, first antenna 17, precharge circuit 18, and power feeding terminal T1. Vehicle 20 includes motor 21, inverter 22, capacitor 23, second power source circuit 24, second controller 25, second wireless communication unit 26, second antenna 27, current sensor 28, and power receiving terminal T2. In a state in which battery pack 10 is mounted on vehicle 20, power feeding terminal T1 and power receiving terminal T2 are brought into physical contact with each other, and the power line Lp1 in battery pack 10 and power line Lp2 in vehicle 20 are electrically conducted.

Storage battery 11 includes a plurality of cells connected in series or series-parallel. Examples of the cells that can be used include a lithium-ion battery cell, a nickel-metal hydride battery cell, a lead battery cell, and the like. Hereafter, in the specification, using a lithium-ion battery cell (nominal voltage: 3.6 V to 3.7 V) is assumed as an example. The number of cells connected in series is determined according to a driving voltage of motor 21 of vehicle 20.

Main relay 12 is inserted into power line Lp1 that connects between storage battery 11 and power feeding terminal T1. Instead of a relay, other types of switches such as a semiconductor switch may be used. Precharge circuit 18 is connected in parallel with main relay 12. A specific circuit configuration example of precharge circuit 18 is described later.

First power source circuit 14 is a DC/DC converter that reduces a voltage of storage battery 11 to generate a power source voltage (for example, about 3.3 V to 5 V) of first controller 15. First power source circuit 14 may include a switching regulator or a linear regulator.

First controller 15 is a microcontroller that controls entire battery pack 10. First controller 15 monitors a state of storage battery 11 (specifically, a voltage, a current, and a temperature of each cell included in storage battery 11). Based on these monitored data, first controller 15 estimates the SOC (State of Charge), FCC (Full Charge Capacity), and SOH of each cell included in storage battery 11. Furthermore, when an overvoltage, an undervoltage, an overcurrent, an abnormal high temperature or an abnormal low temperature occurs in a cell included in storage battery 11, first controller 15 turns off main relay 12 to protect the cell.

First wireless communication unit 16 executes near-field wireless communication processing. In this exemplary embodiment, first wireless communication unit 16 includes a BLE module. First antenna 17 includes a chip antenna or a pattern antenna incorporated in the BLE module. First wireless communication unit 16 outputs data received by near-field wireless communication to first controller 15 and transmits data input from first controller 15 by near-field wireless communication.

In this exemplary embodiment, vehicle 20 includes a three-phase AC motor as motor 21 for driving. Inverter 22 converts DC power supplied from battery pack 10 into AC power and supplies it to motor 21 during power running. During regeneration, AC power supplied from motor 21 is converted into DC power and supplied it to battery pack 10. Motor 21 rotates according to the AC power supplied from inverter 22 during power running. During regeneration, rotational energy by deceleration is converted into AC power and supplied to inverter 22.

Capacitor 23 is connected in parallel to power line Lp2 that connects between power receiving terminal T2 and inverter 22. More specifically, capacitor 23 is connected between the positive wiring of power line Lp2 and the negative wiring (or ground potential). For capacitor 23, for example, a large-capacity film capacitor is used. Capacitor 23 is used to stabilize the operation of inverter 22 by absorbing the voltage fluctuation of the power line Lp2 and the spike noise generated by the switching operation of inverter 22, or to protect it from failure. When power source is turned on, since a large inrush current flows from battery pack 10 to charge capacitor 23, a precharge process is performed to charge capacitor 23 to a predetermined voltage while limiting the supply current to the power line Lp2 when power source is turned on.

Second power source circuit 24 is a DC/DC converter that reduces a voltage supplied from storage battery 11 in battery pack 10 mounted on vehicle 20 and generates the power source voltage (for example, about 3.3 V to 5 V) of second controller 25. Second power source circuit 24 may include a switching regulator or a linear regulator. In this exemplary embodiment, in vehicle 20, own battery (for example, a lead battery) for generating a control power source is not installed. Therefore, it is necessary to generate the control power source from the power source supplied from storage battery 11 in the mounted battery pack 10.

Current sensor 28 detects a current flowing through power line Lp2 in vehicle 20, and outputs the detected current to second controller 25. Current sensor 28 includes a combination of, for example, a CT sensor and a current detection circuit. The current detection circuit outputs a current flowing through a coil wound around a magnetic core of the CT sensor and a current detection value as a voltage value taken out by the shunt resistor to second controller 25. Instead of the CT system, a Hall element system, a Rogowski coil system, or the like, may be used.

Second controller 25 is a microcontroller that controls entire vehicle 20. Second wireless communication unit 26 performs near-field wireless communication processing. In this exemplary embodiment, second wireless communication unit 26 includes a BLE module, second antenna 27 can be formed of a chip antenna or a pattern antenna incorporated in the BLE module. Second wireless communication unit 26 outputs data received by near-field wireless communication to second controller 25, and transmits data input from second controller 25 by near-field wireless communication.

Figure 4:
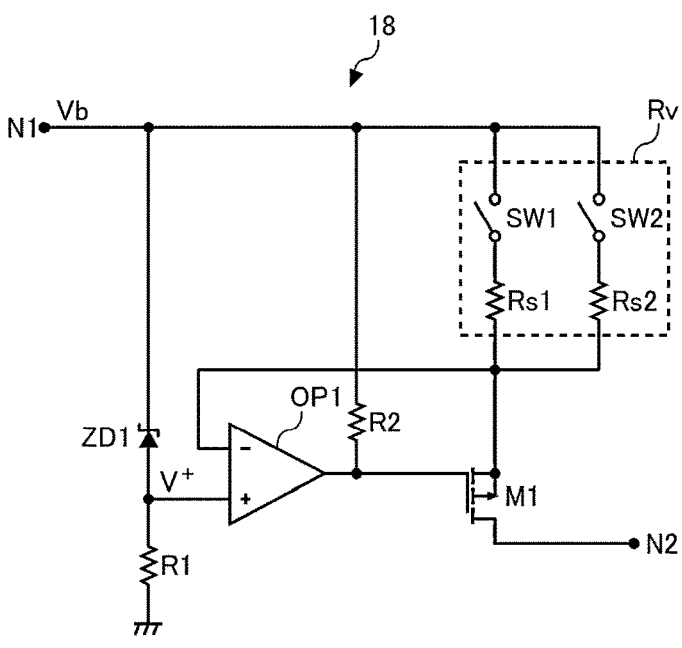
FIG. 4 is a view showing a circuit configuration example of a precharge circuit of FIG. 3.

FIG. 4 is a view showing a circuit configuration example of precharge circuit 18 of FIG. 3. Precharge circuit 18 shown in FIG. 4 includes a constant current circuit capable of outputting current values of a plurality of levels. Precharge circuit 18 includes an operational amplifier OP1, a Zener diode ZD1, a voltage dividing resistor R1, a resistor R2, a variable resistor part Rv and a P-channel MOSFET (Metal Oxide Semiconductor Field Effect Transistor) (M1).

A variable resistor part Rv and a P-channel MOSFET (M1) are connected in series between an input node N1 and an output node N2 of precharge circuit 18. The source terminal of the P-channel MOSFET (M1) is connected to the variable resistor part Rv, and the drain terminal of the P-channel MOSFET (M1) is connected to the output node N2. A voltage Vb of storage battery 11 (a voltage of input node N1) is applied to the gate terminal of the P-channel MOSFET (M1) via resistor R2. Note here that instead of the P-channel MOSFET (M1), a bipolar transistor may be used.

The voltage Vb of storage battery 11 is divided by a Zener diode ZD1 and a voltage dividing resistor R1 to generate a reference voltage V', and the reference voltage V' is input into a non-inverting input terminal of the operational amplifier OP1. The inverted input terminal of the operational amplifier OP1 is connected to a node between the variable resistor part Rv and the FET (M1). The output terminal of the operational amplifier OP1 is connected to the gate terminal of the P-channel MOSFET (M1).

The current Iout output from precharge circuit 18 to output node N2 is defined by the following mathematical formula (Math. 1) where Rs is a resistance value of a variable resistor part Rv:

$$Iout \approx (Vb - V^+)/Rs \quad (Math.1)$$

In Example shown in FIG. 4, the variable resistor part Rv includes a first limiting resistor Rs1, a second limiting resistor Rs2, a first switch SW1, and a second switch SW2. First switch SW1 and first limiting resistor Rs1 are connected in series, second switch SW2 and second limiting resistor Rs2 are connected in series, and two series circuits are connected in parallel. For example, MOSFETs can be used for the first switch SW1 and the second switch SW2.

First controller 15 can make the resistance value Rs of the variable resistor part Rv variable by controlling on/off of the first switch SW1 and on/off of the second switch SW2. Hereafter, the resistance value of the first limiting resistor Rs1 is lower than the resistance value of the second limiting resistor Rs2.

First controller 15 can set the resistance value Rs of the variable resistor part Rv to the resistance value of the first limiting resistor Rs1 by controlling the first switch SW1 on and the second switch SW2 off. At this time, first current value I1 is output from precharge circuit 18 (see FIG. 5 described later). First controller 15 causes first switch SW1 to be turned on, and second switch SW2 to be turned off, thereby, the resistance value Rs of variable resistor part Rv can be set to the resistance value of second limiting resistor Rs2. At this time, second current value I2 is output from precharge circuit 18 (see FIG. 5 described later).

First controller 15 causes first switch SW1 and second switch SW2 to be turned on, and thereby, the resistance value Rs of variable resistor part Rv can be set to a synthesis resistance value of first limiting resistor Rs1 and second limiting resistor Rs2. First controller 15 can cause precharge circuit 18 to be turned off by causing first switch SW1 and second switch SW2 to be turned off.

In this way, in precharge circuit 18 shown in FIG. 4, since resistance value Rs of variable resistor part Rv can be switched among three types, precharge circuit 18 can output three levels of current values. Note here that by further increasing the number of limiting resistors connected in parallel, four levels or more of current values can be output.

In the example shown in FIG. 4, the limiting resistor between the input node N1 and the output node N2 is made variable, but the limiting resistor may be made to be fixed and the voltage dividing resistor R1 may be made variable. In this case, precharge circuit 18 can output current values of a plurality of levels by making the reference voltage V⁺ variable.

Figure 5:
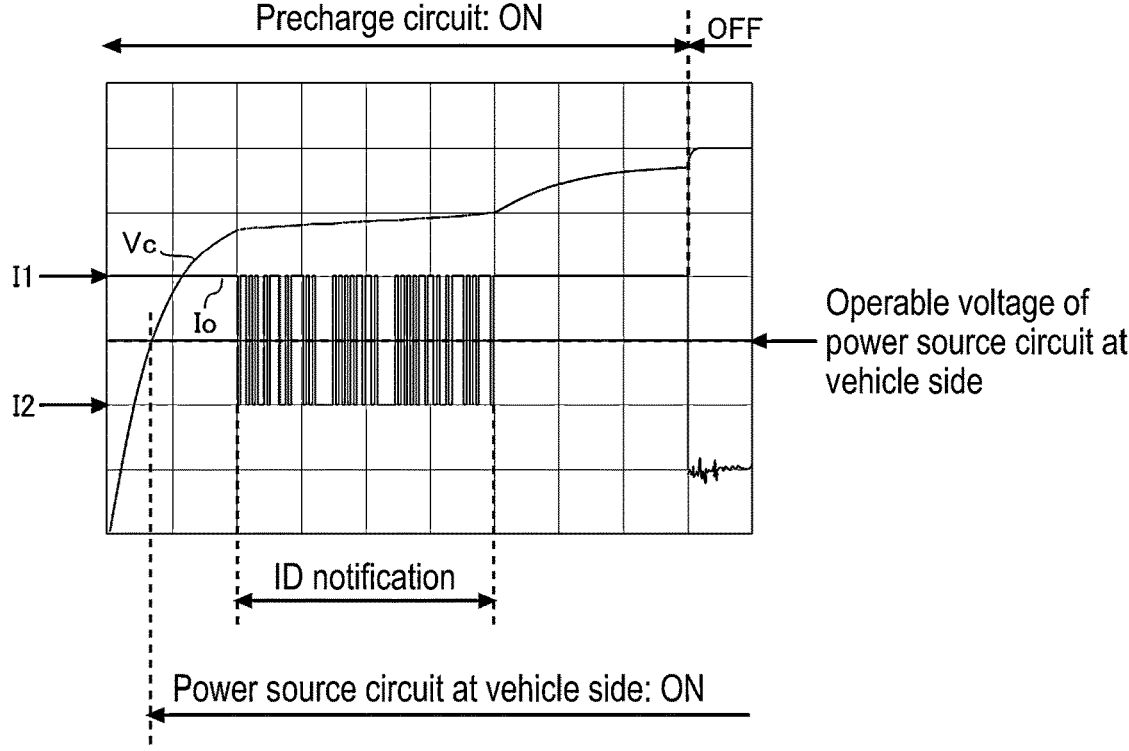

FIG. 5 is a waveform diagram showing an example of an operation from battery pack 10 to vehicle 20 when the power source is turned on. When battery pack 10 is mounted on vehicle 20, and an operation of turning on the power source of vehicle 20 is carried out, first controller 15 of battery pack 10 firstly turns on precharge circuit 18 without turning on main relay 12. In the example shown in FIG. 5, first controller 15 turns on the first switch SW1 in precharge circuit 18 to allow a current to flow from storage battery 11 to vehicle 20 side through first limiting resistor Rs1.

The current supplied from storage battery 11 to vehicle 20 side charges capacitor 23 in vehicle 20, and voltage Vc of capacitor 23 is increased. When voltage Vc of capacitor 23 rises to a voltage at which second power source circuit 24 is operable, the power source voltage starts to be supplied from second power source circuit 24 to second controller 25, and second controller 25 is activated.

When a predetermined time has passed after precharge circuit 18 is turned on, first controller 15 superimposes a current pattern representing ID of battery pack 10 (hereinafter, referred to as "pack ID") on the electric power supplied from storage battery 11 to vehicle 20 through precharge circuit 18. The predetermined time is set to a time period longer than time necessary for activating second controller 25 after start of supplying vehicle 20 with electric power. That is, when power supply to vehicle 20 is started, first controller 15 generates a current pattern through precharge circuit 18 after a predetermined time longer than elapsed time until reaching an operable voltage of second power source circuit 24 that generates the power source voltage of vehicle 20 from electric power fed from storage battery 11.

As described above, first controller 15 controls variable resistor part Rv inside precharge circuit 18, thus enabling first current value I1 and second current value I2 to be output from precharge circuit 18. In the example shown in FIG. 5, first current value I1 is assigned to the high level of the pack ID specified in binary number, and the second current value I2 is assigned to the low level of the pack ID specified in binary number. First controller 15 switches between first current value I1 and second current value I2 depending on the level of each bit of pack ID. First current value I1 and second current value I2 are set to values other than zero.

Current sensor 28 in vehicle 20 detects a current Io flowing in power line Lp2 in vehicle 20 and outputs the detected current Io to second controller 25. Second controller 25 detects a current pattern superimposed on electric power supplied from battery pack 10 based on the current Io detected by current sensor 28, and reads the pack ID.

First controller 15 of battery pack 10 allows first wireless communication unit 16 to transmit an advertisement packet including pack ID identical to the pack ID superimposed on the electric power supplied to vehicle 20. Second wireless communication unit 26 of vehicle 20 receives the advertisement packet, and then outputs the received advertisement packet to second controller 25. Second controller 25 collates the pack ID included in the advertisement packet with the pack ID read from the current pattern superimposed on the power supplied from battery pack 10. When both match, second controller 25 authenticates that mounted battery pack 10 is identical to the communication partner of near-field wireless communication.

When the precharge period ends, first controller 15 turns off precharge circuit 18 and turns on main relay 12. The timing at which the precharge period ends is set at the time when a predetermined period has passed from the end of the ID notification by the current pattern.

Figure 6:
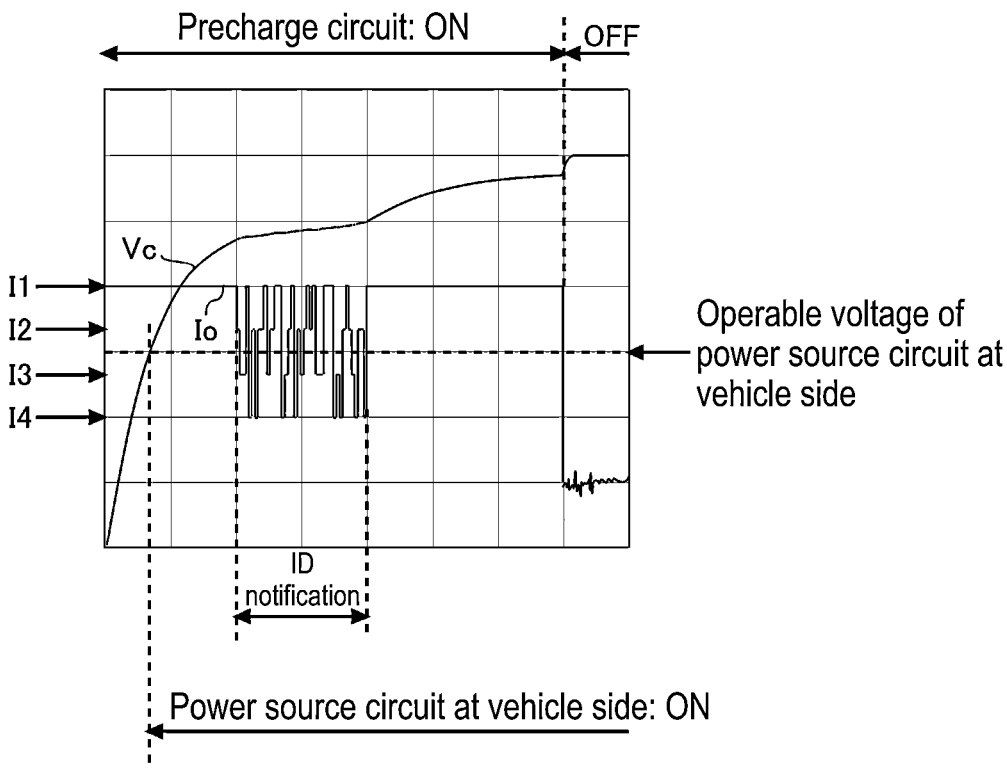

FIG. 6 is a waveform diagram showing another operation example when power source is turned on from battery pack 10 to vehicle 20. FIG. 6 shows an example in which precharge circuit 18 can output four levels of current values I1, I2, I3, and I4. All of the four levels of current values I1, I2, I3, and I4 are set to values other than zero.

First controller 15 converts the pack ID in quinary number, generates a current pattern representing the pack ID specified in quinary number with four levels of current values I1, I2, I3, and I4, and superimposes the current pattern on the power supplied to vehicle 20. When FIG. 5 and FIG. 6 are compared with each other, the pack ID notification period is shortened in FIG. 6 in which a current is multivalued. When the current is further multivalued, the pack ID notification period is further reduced.

As described above, according to this exemplary embodiment, when the pack ID is notified from the battery pack to vehicle 20 in a precharge current pattern, pack ID that can be easily detected at a vehicle 20 can be notified using a power line from battery pack 10 to vehicle 20. The precharge current charges capacitor 23 of vehicle 20 without being cut off. During the time, by changing the current level of the precharge current, the pack ID is notified from battery pack 10 to vehicle 20.

That is to say, first controller 15 of battery pack 10 notifies the pack ID using precharge circuit 18 at the same time of precharging. Second controller 25 of vehicle 20 detects the pack ID using current sensor 28. At the time, since the electric power from battery pack 10 to vehicle 20 is not cut off, the power source of second controller 25 is not interrupted even if its own battery is not installed in vehicle 20. Therefore, during notification period of the pack ID, second controller 25 operates normally and can detect the pack ID normally.

In this respect, when the pack ID is notified in the pattern of supply/cutoff of electric power of the power line, in vehicle 20 in which its own battery is not installed, the power source of second controller 25 is interrupted at the timing of cutoff of electric power, and the pack ID cannot be detected normally. In this way, in vehicle 20 such as an electrically assisted bicycle in which its own battery is not installed, the supply of control power source from battery pack 10 to second controller 25 need to be maintained at all times, and the voltage or current cannot be temporarily cut off to notify the pack ID. In this respect, in this embodiment, no cutoff of voltage or current occurs during the notification period of the pack ID.

As change of hardware in battery pack 10, since precharge circuit 18 is only configured to be variable, a special circuit for notification and detection of a pack ID is not required to be significantly added. Therefore, the increase in cost and mounting area due to the increase in the number of circuit components can be suppressed.

Furthermore, since notification and detection of the pack ID and the start-up of a power system of vehicle 20 are performed simultaneously, the time between the start of communication and the start of running can be shortened. As the precharge current is more multivalued, the time required for the notification and detection of the pack ID can be shortened.

In this exemplary embodiment, vehicle 20 collates the pack ID read out from the precharge current with the pack ID received wirelessly to verify the mounted battery pack 10. This prevents accidental misconnection with another battery pack that is present in the surrounding area, ensuring the safety and security of the entire system.

Furthermore, as shown in FIG. 4, by configuring precharge circuit 18 to be a variable constant current source, current values of a plurality of levels can be generated with high accuracy. It is also possible to configure precharge circuit 18 only with the variable resistor part Rv without using the constant-current source configuration. In this case, costs can be eliminated.

In the above, the present disclosure is described based on the exemplary embodiments. The exemplary embodiments are examples, and a person skilled in the art would easily understand that various modified examples combining the component elements or treatment processing of the exemplary embodiments can be made and that such modified examples are also in the scope of the present disclosure.

In the above exemplary embodiment, an example of battery pack 10 incorporating storage battery 11 is described. In this respect, a capacitor pack incorporating a capacitor, including an electric double-layer capacitor cell, a lithium-ion capacitor cell, and the like, may be used. In this specification, a battery pack and a capacitor pack are collectively referred to as a power storage pack.

The disclosure is suitable for application to vehicle 20 in which its own power source is not installed, but the disclosure does not exclude application to vehicle 20 in which its own power source is installed. Therefore, vehicle 20 is not limited to an electrically assisted bicycle, and includes electric bikes (electric scooters), electric kick scooters, electric vehicles (including low-speed electric vehicles such as golf carts and land cars), railway vehicles, and the like. In addition, the objects to which the power storage pack is mounted are not limited to vehicle 20, but include, for example, electric moving bodies such as electric vessels and multicopters (drones).

Note here that the exemplary embodiments may be specified by the following items.

[Item 1] A power storage pack (10) including:

a power storage unit (11) for feeding electric power to an electric moving body (20); and a controller (15) superimposing a current pattern representing identification information of the power storage pack (10) on electric power to be supplied to the electric moving body (20), wherein the controller (15) generates the current pattern with current values of a plurality of levels other than zero level.

According to this, identification information of the power storage pack (10) easily detected at an electric moving body (20) side can be notified.

[Item 2] The power storage pack (10) described in the item 1, further including:

a power line (Lp1), inside the pack, connecting between the power storage unit (11) and a power feeding terminal (T1);

a main switch (12) inserted into the power line (Lp1); and a precharge circuit (18) connected in parallel with the main switch (12), wherein the controller (15) superimposes the current pattern on the electric power to be supplied to the electric moving body (20) through the precharge circuit (18).

According to this, since the identification information of the power storage pack (10) is notified using a precharge current supplied when the electric moving body (20) is turned on, time from the start of running to the start of communication can be shortened.

[Item 3] The power storage pack (10) described in the item 2, wherein the precharge circuit (18) includes a variable constant current circuit (18) capable of outputting current values of a plurality of levels.

According to this, current values of a plurality of levels can be output.

[Item 4] The power storage pack (10) described in any one of the items 1 to 3, further including a wireless communication unit (16) transmitting a signal including identification information identical to the identification information superimposed on the electric power to be supplied to the electric moving body (20) via near-field wireless communication.

This can verify that the mounted power storage pack (10) and the power storage pack (10) of a communication partner are identical to each other.

[Item 5] The power storage pack (10) described in any one of the items 1 to 4, wherein when supplying of electric power from the power storage unit (11) to the electric moving body (20) is started, the controller (15) generates the current pattern, after a predetermined time longer than elapsed time until reaching an operable voltage of a power source circuit (24) that generates a power source voltage of the electric moving body (20) from electric power supplied from the power storage unit (11).

According to this, identification information of the power storage pack (10) can be normally conveyed from the power storage pack (10) to the electric moving body (20) in which its own battery is not installed.

[Item 6] A power storage pack (10) including:

a power storage unit (11) for feeding electric power to an electric moving body (20); and a controller (15) for superimposing a current pattern representing identification information of the power storage pack (10) on the electric power supplied to the electric moving body (20), wherein when supplying of electric power from the power storage unit (11) to the electric moving body (20) is started, the controller (15) generates the current pattern, after a predetermined time longer than elapsed time until reaching an operable voltage of a power source circuit (24) that generates a power source voltage of the electric moving body (20) from electric power supplied from the power storage unit (11).

The electric moving body (20) may not include a power source in a state in which the power storage pack (10) is not mounted.

The controller (15) may start supplying of electric power to the electric moving body (20) when controller (15) detects that the power storage pack (10) is mounted on the electric moving body (20).

According to this, identification information of the power storage pack (10) can be normally conveyed from the power storage pack (10) to the electric moving body (20) in which its own battery is not installed.

[Item 7] An electric moving body (20) in which the power storage pack (10) described in any one of the items 1 to 6 is mounted, the electric moving body (20) including:

a motor (21);

a drive circuit (22) driving the motor (21);

a power line (Lp2), inside the electric moving body (20), connecting between the drive circuit and a power receiving terminal (T2); and a controller (25) detecting the current pattern superimposed on electric power supplied to the power line (Lp2) and reading out the identification information.

According to this, even if its own battery is not installed in the electric moving body (20), identification information of the power storage pack (10) can be accurately read out.

[Item 8] The electric moving body (20) described in the item 7, further including a capacitor (23) for precharging, in a front stage of the drive circuit (22).

This can reduce an inrush current at the time of start-up.

[Item 9] The electric moving body (20) described in the item 7 or 8, wherein a power source of the controller (25) of the electric moving body (20) is supplied from the power storage pack (10) through the power line (Lp2).

According to this, even if the electric moving body (20) does not include its own battery, the electric moving body (20) can normally operate.

[Item 10] The electric moving body (20) described in any one of the items 7 to 9, further including a wireless communication unit (26) executing near-field wireless communication, wherein the controller (25) of the electric moving body (20) authenticates that the power storage pack (10) mounted on the electric moving body (20) is identical to a communication partner of the near-field wireless communication, when the identification information included in a signal received by the wireless communication unit (26) matches the identification information read out from the current pattern superimposed on electric power supplied to the power line (Lp2).

This can verify that the mounted power storage pack (10) and power storage pack (10) of the communication partner are identical to each other.

REFERENCE SIGNS LIST

2 network
3 battery pack management system
10 battery pack
20 vehicle
30 portable terminal device
11 storage battery
12 main relay
14 first power source circuit
15 first controller
16 first wireless communication unit
17 first antenna
18 precharge circuit
21 motor
22 inverter
23 capacitor
24 second power source circuit
25 second controller
26 second wireless communication unit
27 second antenna
28 current sensor
T1 power feeding terminal
T2 power receiving terminal
OP1 operational amplifier
ZD1 Zener diode
R1 voltage dividing resistor
R2 resistor
Rv variable resistor part
Rs1 first limiting resistor
Rs2 second limiting resistor
SW1 first switch
SW2 second switch
M1 P-channel MOSFET.

The invention claimed is:

1. A power storage pack comprising:

a power storage unit for feeding electric power to an electric moving body;

a controller superimposing a current pattern representing identification information of the power storage pack on electric power to be supplied to the electric moving body;

a power line, inside the power storage pack, connecting between the power storage unit and a power feeding terminal;

a main switch inserted into the power line; and a precharge circuit connected in parallel with the main switch, wherein the controller generates the current pattern with current values of a plurality of levels other than zero level and superimposes, while the main switch is off, the current pattern on the electric power to be supplied to the electric moving body through the precharge circuit.

2. The power storage pack according to claim 1, wherein the precharge circuit includes a variable constant current circuit configured to output current values of a plurality of levels.

3. The power storage pack according to claim 1, further comprising:

a wireless communication unit transmitting a signal including identification information identical to the identification information superimposed on the electric power to be supplied to the electric moving body via near-field wireless communication.

4. The power storage pack according to claim 1, wherein when supplying of electric power from the power storage unit to the electric moving body is started, the controller generates the current pattern, after a predetermined time longer than elapsed time until reaching an operable voltage of a power source circuit that generates a power source voltage of the electric moving body from electric power supplied from the power storage unit.

5. An electric moving body in which the power storage pack according to claim 1 is mounted, the electric moving body comprising:

a motor;

a drive circuit driving the motor, a power line, inside the electric moving body, connecting between the drive circuit and a power receiving terminal; and a controller detecting the current pattern superimposed on electric power supplied to the power line and reading out the identification information.

6. The electric moving body according to claim 5, further comprising a capacitor for precharging in a front stage of the drive circuit.

7. The electric moving body according to claim 5, wherein a power source of the controller of the electric moving body is supplied from the power storage pack through the power line.

8. The electric moving body according to claim 5, further comprising a wireless communication unit executing near-field wireless communication, wherein the controller of the electric moving body authenticates that the power storage pack mounted on the electric moving body is identical to a communication partner of the near-field wireless communication, when the identification information included in a signal received by the wireless communication unit matches the identification information read out from the current pattern superimposed on the electric power supplied to the power line.

\* \* \* \* \*